(12) United States Patent
Zarringhalam et al.

(10) Patent No.: US 12,662,045 B2
(45) Date of Patent: Jun. 23, 2026

(54) INTELLIGENT TURN SIGNAL SYSTEM

(71) Applicant: GM Global Technology Operations LLC, Detroit, MI (US)

(72) Inventors: Reza Zarringhalam, Whitby (CA); Milad Jalaliyazdi, Richmond Hill (CA); Craig A. Pachciarz, Troy, MI (US); Emily Camille Miele, Clarkston, MI (US); Alexander Gene Rath, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/970,371

(22) Filed: Dec. 5, 2024

(65) Prior Publication Data

US 2026/0158992 A1 Jun. 11, 2026

(51) Int. Cl.
H05B 47/105 (2020.01)
B60Q 1/40 (2006.01)

(52) U.S. Cl.
CPC ............. B60Q 1/40 (2013.01); H05B 47/105 (2020.01)

(58) Field of Classification Search
CPC ...... H05B 47/105; H05B 47/125; B60Q 1/40; B60Q 1/346; B60Q 5/006; B60Q 9/008; B60Q 2300/122; B60Q 2300/142
See application file for complete search history.

(56) References Cited

U.S. PATENT DOCUMENTS 6,876,300 B2 * 4/2005 Ponziani ............... B60Q 1/346
340/475
8,648,535 B2 * 2/2014 Tatara ................... B60Q 1/085
362/466

9,616,809 B1 * 4/2017 Alasry .................. G08G 1/167
10,011,216 B1 * 7/2018 Rovik .................. G06V 20/597
10,173,586 B1 * 1/2019 Kashchenko .......... G06F 3/017
12,528,506 B2 * 1/2026 Ward ............... B60W 60/0015
2003/0031008 A1 * 2/2003 Kobayashi ............. B60Q 1/085
362/464

FOREIGN PATENT DOCUMENTS

DE 102013225138 A1 6/2015
DE 102017128201 A1 6/2018
DE 102017206605 A1 10/2018
DE 102019133650 A1 6/2021
DE 102022107730 A1 10/2023

* cited by examiner

*Primary Examiner* — Tung X Le

(74) *Attorney, Agent, or Firm* — Honigman LLP; Matthew H. Szalach; Jonathan P. O'Brien

(57) ABSTRACT

A method includes, responsive to a turn signal tap by an operator of a vehicle, controlling an external turn signal indicator to provide a turn signal for a pre-determined duration, the turn signal visible to operators of other vehicles, determining an intended driving maneuver of the vehicle by the operator, and determining a location of the vehicle relative to the intended driving maneuver. The method also includes determining, based on the intended driving maneuver and the location, a turn indication score representing whether the intended driving maneuver is complete, based on the turn indication score satisfying a criterion, controlling the external turn signal indicator to continue the turn signal past the pre-determined duration, and, based on the turn indication score not satisfying the criterion, controlling the external turn signal indicator to deactivate the turn signal.

19 Claims, 7 Drawing Sheets

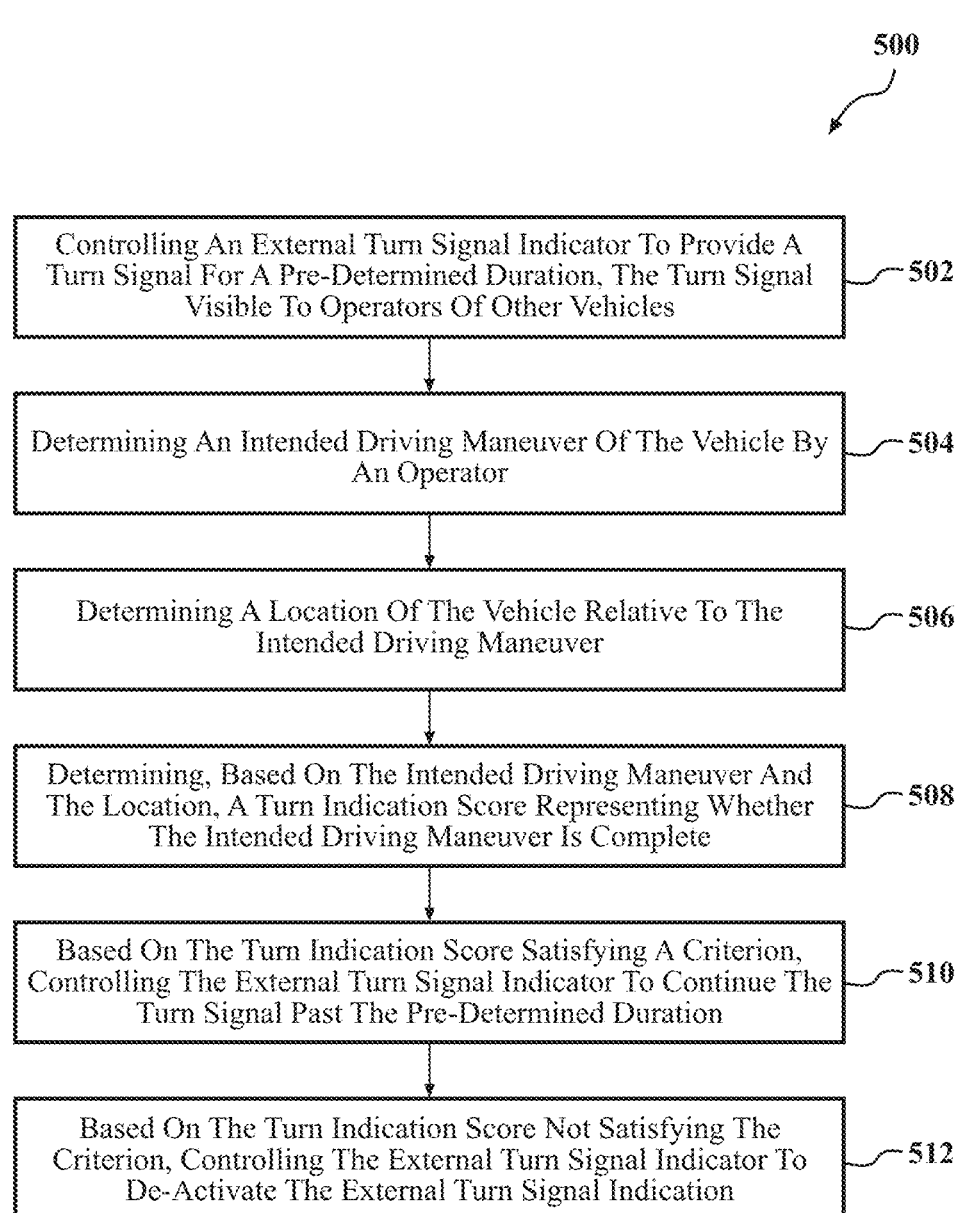

500

Controlling An External Turn Signal Indicator To Provide A
Turn Signal For A Pre-Determined Duration, The Turn Signal
Visible To Operators Of Other Vehicles — 502

Determining An Intended Driving Maneuver Of The Vehicle By
An Operator — 504

Determining A Location Of The Vehicle Relative To The
Intended Driving Maneuver — 506

Determining, Based On The Intended Driving Maneuver And
The Location, A Turn Indication Score Representing Whether
The Intended Driving Maneuver Is Complete — 508

Based On The Turn Indication Score Satisfying A Criterion,
Controlling The External Turn Signal Indicator To Continue The
Turn Signal Past The Pre-Determined Duration — 510

Based On The Turn Indication Score Not Satisfying The
Criterion, Controlling The External Turn Signal Indicator To
De-Activate The External Turn Signal Indication — 512

FIG. 5

INTELLIGENT TURN SIGNAL SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

A turn signal is a crucial safety feature of a vehicle that is used to communicate an operator's intention to turn or change lanes. A turn signal consists of a flashing light, typically amber in color, located on the front and rear corners of the vehicle. When a turn signal lever is activated by an operator, an external turn signal indicator emits a rhythmic blinking pattern to alert other road users of an intended maneuver. This helps to prevent accidents by providing clear and timely warnings to surrounding traffic. A turn signal tap is a brief or partial activation of the turn signal lever, typically used to indicate a lane change or a quick maneuver. The turn signal tap causes the external turn signal indicator to flash for a pre-determined duration (e.g., a few blinks or seconds), alerting other drivers of the intended direction. Here, unlike a full turn signal activation, which stays on until manually turned off or the steering wheel is straightened, the turn signal is momentary and self-cancels after the pre-determined duration. This feature enhances road safety by providing clear and concise communication of a driver's intentions.

The present disclosure relates generally to turn signals and, more specifically, to intelligent turn signal systems.

SUMMARY

One aspect of the disclosure provides a vehicle including a turn signal lever configured to detect a turn signal tap by an operator of the vehicle, the turn signal tap activating a turn signal having a pre-determined duration, an external turn signal indicator configured to, responsive to detection of the turn signal tap, provide the turn signal, the turn signal visible to operators of other vehicles, data processing hardware, and memory hardware. The memory hardware is in communication with the data processing hardware and stores instructions that, when executed by the data processing hardware, cause the data processing hardware to perform operations responsive to the turn signal tap. The operations include determining an intended driving maneuver of the vehicle by the operator and determining a location of the vehicle relative to the intended driving maneuver. The operations also include determining, based on the intended driving maneuver and the location, a turn indication score representing whether the intended driving maneuver is complete, based on the turn indication score satisfying a criterion, controlling the external turn signal indicator to continue the turn signal past the pre-determined duration, and, based on the turn indication score not satisfying the criterion, controlling the external turn signal indicator to de-activate the turn signal.

Implementations of the disclosure may include one or more of the following optional features. In some implementations, determining the intended driving maneuver is based on at least one of a predicted driver intent a measured vehicle dynamic a predicted vehicle dynamic an object detection a lane detection a navigation route the location of the vehicle a traffic control input a map a traffic sign a road marking a traffic light a lane merging a lane split, or an ending lane. In some examples, determining the location of the vehicle relative to the intended driving maneuver includes at least one of determining a location of a trailer towed by the vehicle relative to the intended driving maneuver or determining a location of an object transported by the vehicle relative to the intended driving maneuver. Controlling the external turn signal indicator to continue the turn signal past the pre-determined duration may include continuing the external turn signal indicator until the turn indication score does not satisfy the criterion and all boundary points of the trailer are in a destination lane.

In some examples, the turn indication score includes a weighted sum of at least two of a navigation route, a location of the vehicle, a location of a trailer towed by the vehicle, a location of an object transported by the vehicle, a vehicle kinematic, a trailer kinematic, an operator input to execute the intended driving maneuver, a topology, or trailer information. In some implementations, the turn indication score is determined repeatedly over time as the operator operates the vehicle to perform the intended driving maneuver to determine when to deactivate the turn signal. In some examples, the vehicle also includes an advanced driver-assistance system (ADAS) controller including the data processing hardware and the memory hardware, and a body controller. The body controller configured to detect the turn signal tap, provide an indication of the turn signal tap to the ADAS controller, and control activation and de-activation of the turn signal responsive to inputs from the ADAS controller.

Another aspect of the disclosure provides a computer-implemented method executed by data processing hardware that causes the data processing hardware to perform operations responsive to a turn signal tap by an operator of a vehicle. The operations include determining an intended driving maneuver of the vehicle by the operator and determining a location of the vehicle relative to the intended driving maneuver. The operations also include determining, based on the intended driving maneuver and the location, a turn indication score representing whether the intended driving maneuver is complete, based on the turn indication score satisfying a criterion, controlling the external turn signal indicator to continue the turn signal past the pre-determined duration, and, based on the turn indication score not satisfying the criterion, controlling the external turn signal indicator to de-activate the turn signal.

Implementations of the disclosure may include one or more of the following optional features. In some implementations, determining the intended driving maneuver is based on at least one of a predicted driver intent, a measured vehicle dynamic, a predicted vehicle dynamic, an object detection, a lane detection, a navigation route, the location of the vehicle, a traffic control input, a map, a traffic sign, a road marking, a traffic light, a lane merging, a lane split, or an ending lane. In some examples, determining the location of the vehicle relative to the intended driving maneuver includes at least one of determining a location of a trailer towed by the vehicle relative to the intended driving maneuver or determining a location of an object transported by the vehicle relative to the intended driving maneuver. Controlling the external turn signal indicator to continue the turn signal past the pre-determined duration may include continuing the external turn signal indicator until the turn indication score does not satisfy the criterion and all boundary points of the trailer are in a destination lane.

In some examples, the turn indication score includes a weighted sum of at least two of a navigation route, a location of the vehicle, a location of a trailer towed by the vehicle, a location of an object transported by the vehicle, a vehicle kinematic, a trailer kinematic, an operator input to execute the intended driving maneuver, a topology, or trailer information. In some implementations, the turn indication score is determined repeatedly over time as the operator operates the vehicle to perform the intended driving maneuver to determine when to deactivate the turn signal.

Yet another aspect of the disclosure provides data processing hardware, and memory hardware in communication with the data processing hardware and storing instructions that, when executed by the data processing hardware, cause the data processing hardware to perform operations responsive to a turn signal tap by an operator of a vehicle. The operations include determining an intended driving maneuver of the vehicle by the operator and determining a location of the vehicle relative to the intended driving maneuver. The operations also include determining, based on the intended driving maneuver and the location, a turn indication score representing whether the intended driving maneuver is complete, based on the turn indication score satisfying a criterion, controlling the external turn signal indicator to continue the turn signal past the pre-determined duration, and, based on the turn indication score not satisfying the criterion, controlling the external turn signal indicator to deactivate the turn signal.

Implementations of the disclosure may include one or more of the following optional features. In some implementations, determining the intended driving maneuver is based on at least one of a predicted driver intent, a measured vehicle dynamic, a predicted vehicle dynamic, an object detection, a lane detection, a navigation route, the location of the vehicle, a traffic control input, a map, a traffic sign, a road marking, a traffic light, a lane merging, a lane split, or an ending lane. In some examples, determining the location of the vehicle relative to the intended driving maneuver includes at least one of determining a location of a trailer towed by the vehicle relative to the intended driving maneuver or determining a location of an object transported by the vehicle relative to the intended driving maneuver. Controlling the external turn signal indicator to continue the turn signal past the pre-determined duration may include continuing the external turn signal indicator until the turn indication score does not satisfy the criterion and all boundary points of the trailer are in a destination lane.

In some examples, the turn indication score includes a weighted sum of at least two of a navigation route, a location of the vehicle, a location of a trailer towed by the vehicle, a location of an object transported by the vehicle, a vehicle kinematic, a trailer kinematic, an operator input to execute the intended driving maneuver, a topology, or trailer information. In some implementations, the turn indication score is determined repeatedly over time as the operator operates the vehicle to perform the intended driving maneuver to determine when to deactivate the turn signal.

BRIEF DESCRIPTION OF THE DRAWINGS

The drawings described herein are for illustrative purposes only of selected configurations and are not intended to limit the scope of the present disclosure.

FIG. 5 is a flowchart of another example arrangement of operations for a method of automatically determining, responsive to a turn signal tap, a duration of a momentary turn signal.

Corresponding reference numerals indicate corresponding parts throughout the drawings.

DETAILED DESCRIPTION

Figure 1:
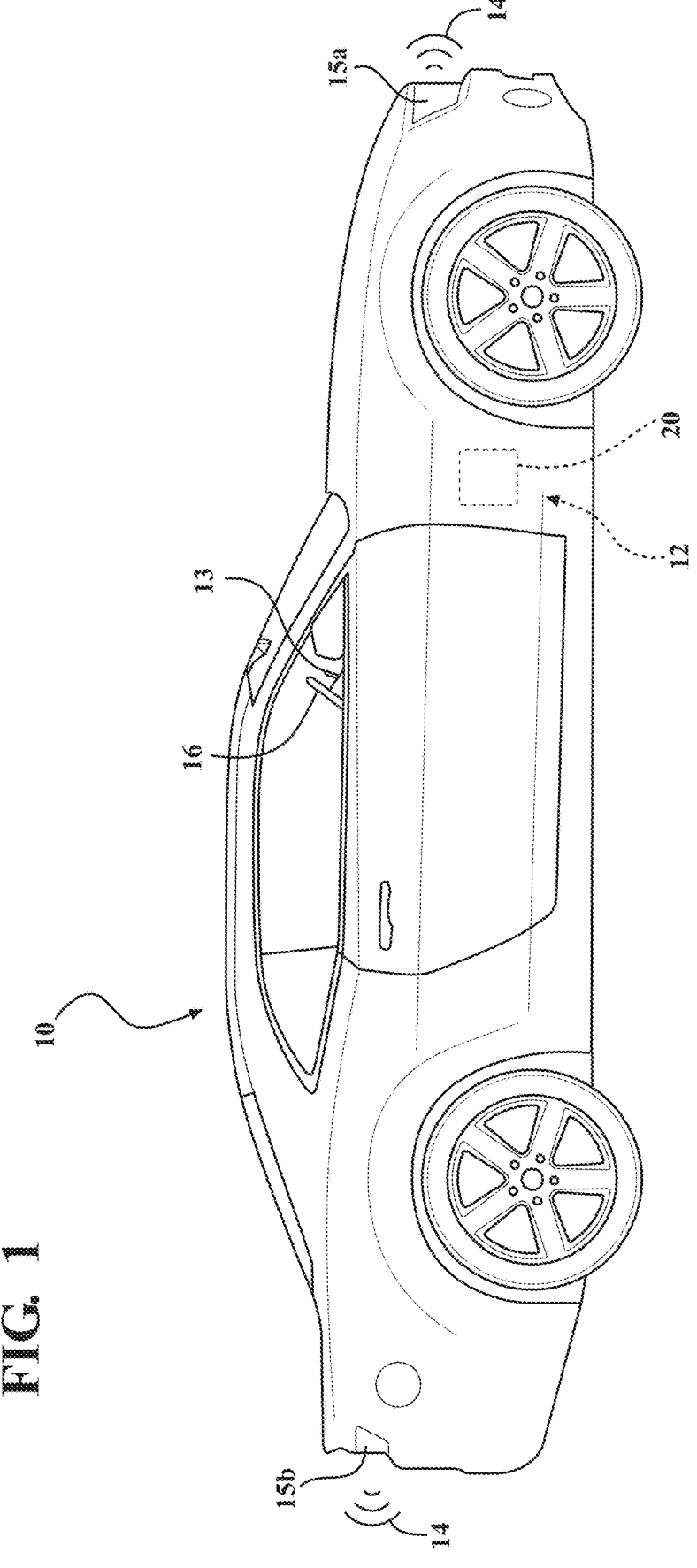
FIG. 1 is a side view of an example vehicle incorporating an intelligent turn signal system in accordance with the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, the phrase "at least one of A, B, or C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least C; and (7) at least one A with at least one B and at least one C. Moreover, unless expressly stated to the contrary, the phrase "at least one of A, B, and C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least one C; and (7) at least one A with at least one B and at least one C. Furthermore, unless expressly stated to the contrary, "A or B" is intended to refer to any combination of A and B, such as: (1) A alone; (2) B alone; and (3) A and B.

While configurations are shown and described herein in connection with a vehicle (e.g., an automobile, a truck, an airplane, a train, a motorcycle, a drone, etc.), it should be understood that disclosed configurations may, additionally or alternatively, be used for any device that provides a turn signal. Here, a vehicle or device may be operated locally or remotely by a person, or may operate independently.

A turn signal is a crucial safety feature of a vehicle that is used to communicate an operator's intention to turn or change lanes. A turn signal consists of a flashing light, typically amber in color, located on the front and rear corners of the vehicle. When a turn signal lever is activated by an operator, an external turn signal indicator emits a rhythmic blinking pattern to alert other road users of an intended maneuver. This helps to prevent accidents by providing clear and timely warnings to surrounding traffic. A turn signal tap is a brief or partial activation of the turn signal lever, typically used to indicate a lane change or a quick maneuver. The turn signal tap causes the external turn signal indicator to flash for a pre-determined duration (e.g., a few blinks), alerting other drivers of the intended direction. Here, unlike a full turn signal activation, which stays on until manually turned off or the steering wheel is straightened, the turn signal is momentary and self-cancels after the pre-determined duration. This feature enhances road safety by providing clear and concise communication of a driver's intentions. However, in some circumstances, it takes an operator more than the pre-determined duration to complete an intended maneuver. In such circumstances, other road users may not continue to be fully alerted throughout the operator's intended maneuver. Therefore, there is a need for an improved system for handling turn signal taps.

Aspects of the present disclosure provide an intelligent turn signal system to automatically determine, responsive to a turn signal tap, a duration of the momentary turn signal based on a detected intended driving maneuver. In particular, when the intelligent turn signal system detects that the intended driving maneuver is not complete, the intelligent turn signal system extends the turn signal beyond the pre-determined duration. Then, once the intended driving maneuver is complete, the intelligent turn signal system de-activates the turn signal.

Figure 2:
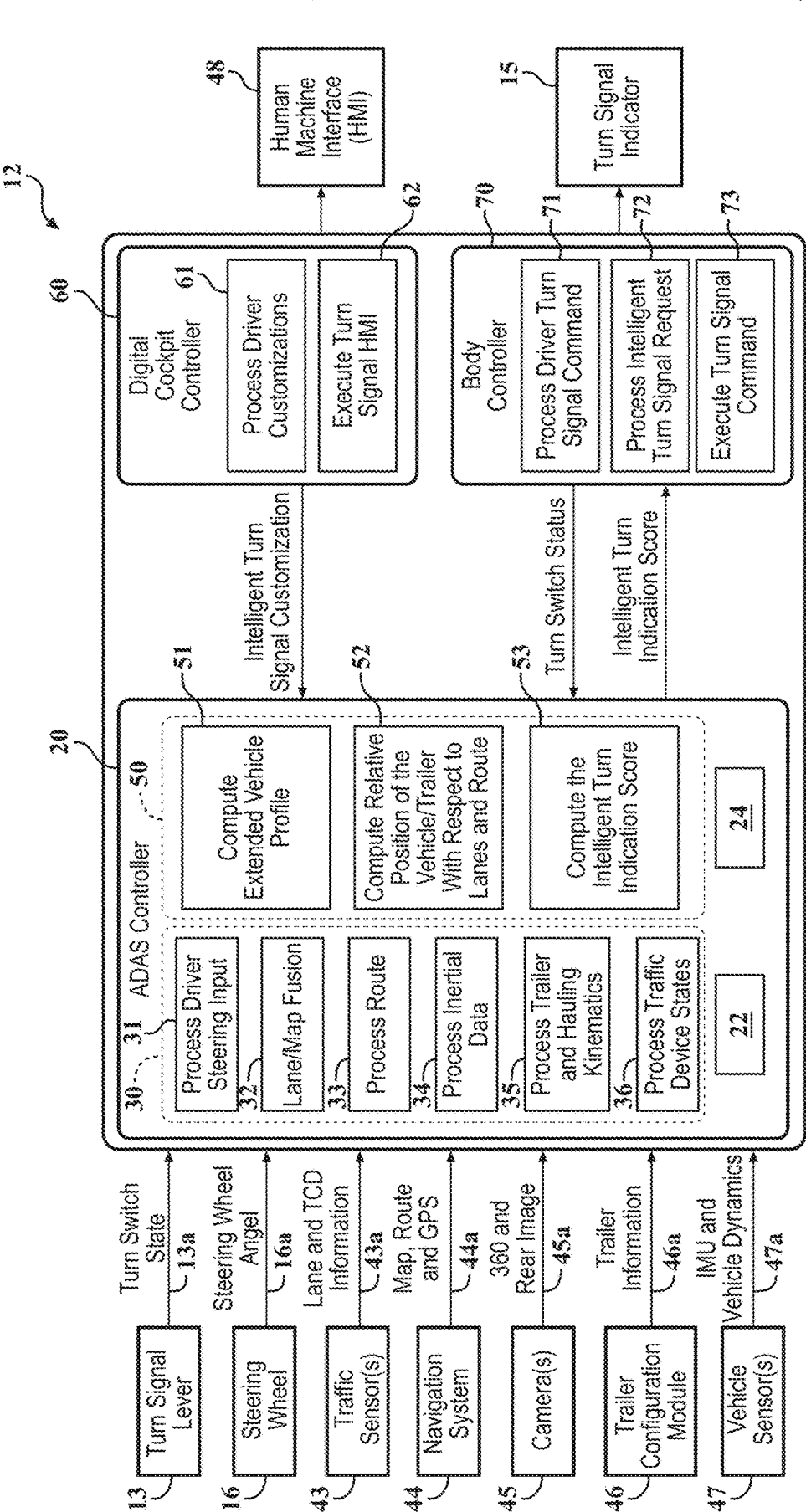
FIG. 2 is a schematic view of the intelligent turn signal system of FIG. 1.

With particular reference to FIGS. 1 and 2, a vehicle 10 (e.g., an automobile, a truck, an airplane, a train, a motorcycle, a drone, etc.) is shown in conjunction with an intelligent turn signal system 12. The intelligent turn signal system 12 (also referred to herein as system 12) is configured to automatically determine, responsive to a turn signal tap of a turn signal lever 13 by an operator of the vehicle 10, a duration of a momentary turn signal 14 that is displayed on one or more external turn signal indicators 15, 15a-n of the vehicle 10. Here, the system 12 detects an intended driving maneuver and determines the duration of the momentary turn signal 14 based on a location of the vehicle 10 relative to the intended driving maneuver. In particular, when the system 12 detects that the intended driving maneuver is not complete, the system 12 controls the external turn signal indicators 15 to extend the turn signal 14 beyond a pre-determined duration. Then, once the intended driving maneuver is complete, the system 12 controls the external turn signal indicators 15 to de-activate the turn signal 14. This is in stark contrast to conventional systems that simply display, in response to a turn signal tap, a momentary turn signal for only a pre-determined duration.

The system 12 includes a controller 20, which may be, for example, an advanced driver-assistance system (ADAS) controller or any other controller of the vehicle 10. Specifically, the controller 20 stores machine-readable instructions for executing the operations shown in any of FIGS. 4 and 5 or described elsewhere in the present disclosure, for example, on memory hardware 22. The instructions may be executed by data processing hardware 24 (e.g., a processor) of the controller 20 to perform the operations.

In the illustrated example, the controller 20 includes an input processing module 30 that is in communication with: the turn signal lever 13 for receiving turn signal switch information 13a; a steering wheel 16 for receiving steering wheel angle information 16a; one or more traffic sensors 43 for receiving lane and/or traffic control data (TCD) information 43a; a navigation system 44 for receiving map, route and/or global positioning system (GPS) information 44a; one or more cameras 45 for receiving front, side, rear and/or 360 degree image data 45a; a trailer configuration module 46 for receiving trailer information 46a; and one or more vehicle sensors 47 for receiving inertial measurement unit (IMU) and/or vehicle dynamics information 47a.

The input processing module 30 includes: a module 31 for processing the steering wheel angle information 16a for determining whether the vehicle 10 is turning; and a module 32 for processing the lane and TCD information 43a and the map, route and/or GPS information 44a to fuse lane and map information to determine a location of the vehicle 10. The input processing module 30 also includes: a module 33 for processing the lane and/or TCD information 43a and the map, route and/or GPS information 44a to determine an intended driving maneuver or intended route for the vehicle 10 and/or to localize the vehicle 10 to a particular lane or lane exit; and a module 34 for processing the IMU and/or vehicle dynamics information 47a (e.g., acceleration, yaw, speed, etc.) to determine inertial data representing a motion of the vehicle 10. The input processing module 30 also includes: a module 35 for processing the trailer information 46a for determining trailer and hauling kinematics; and a module 36 for processing the lane and/or TCD information 43a for determining traffic states. Here, the trailer configuration module 46 may be, for example, an application or interface presented on a human-machine interface (HMI) of the vehicle 10.

The controller 20 also includes an intelligent turn indication score module 50 for determining a turn indication score S. The intelligent turn indication score module 50 includes a module 51 for determining, based on information determined by the input processing module 30, an extended vehicle profile. Here, the extended vehicle profile may include, for example, driver inputs, driving patterns, predicted vehicle dynamics, and trailer/cargo information. The intelligent turn indication score module 50 also includes a module 52 for determining, based on information determined by the input processing module 30, an intended driving maneuver and/or a relative position, or location, of the vehicle 10 (which may include a trailer) with respect to a lane occupied by, or a route of, the vehicle 10 relative to the intended driving maneuver. Here, the module 52 may, for example, determine scene geometry, and/or real-time vehicle and/or trailer kinematics. In some examples, determining the location of the vehicle 10 includes determining a location of a trailer towed by the vehicle 10, or a location of an object transported by the vehicle 10. In some implementations, the intended driving maneuver is determined based on some or all of a predicted driver intent, a measured vehicle dynamic, a predicted vehicle dynamic, an object detection, a lane detection, a navigation route, the location of the vehicle, a traffic control input, a map, a traffic sign, a road marking, a traffic light, a lane merging, a lane split, and an ending lane.

Figure 3A:
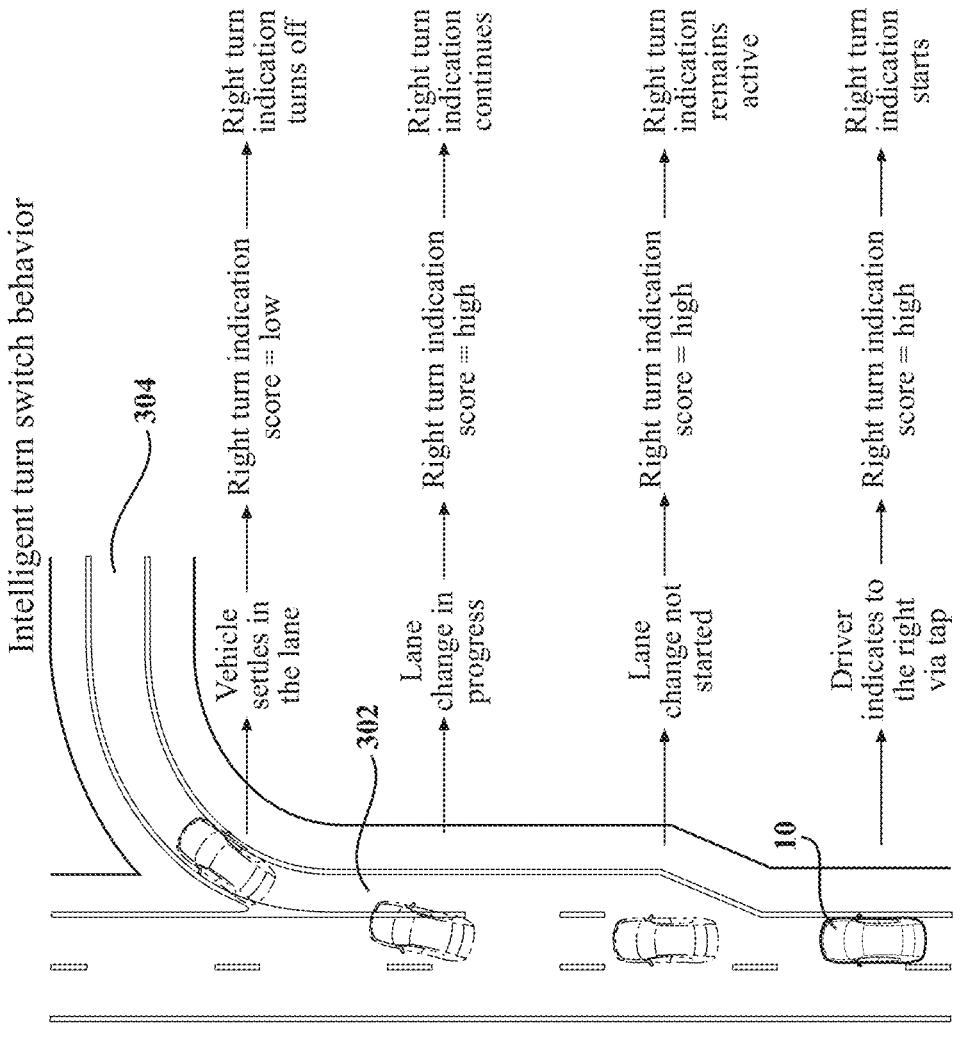
FIGS. 3A-3D are illustrations of example driving maneuvers.
Figure 3C:
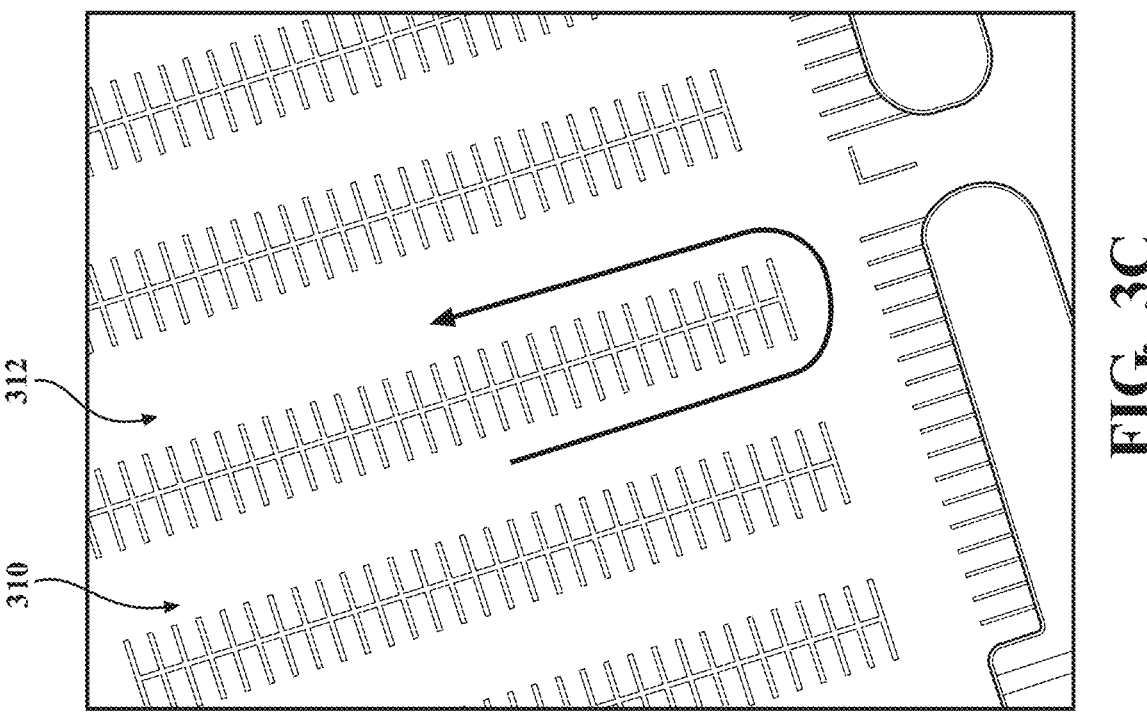
Figure 3B:
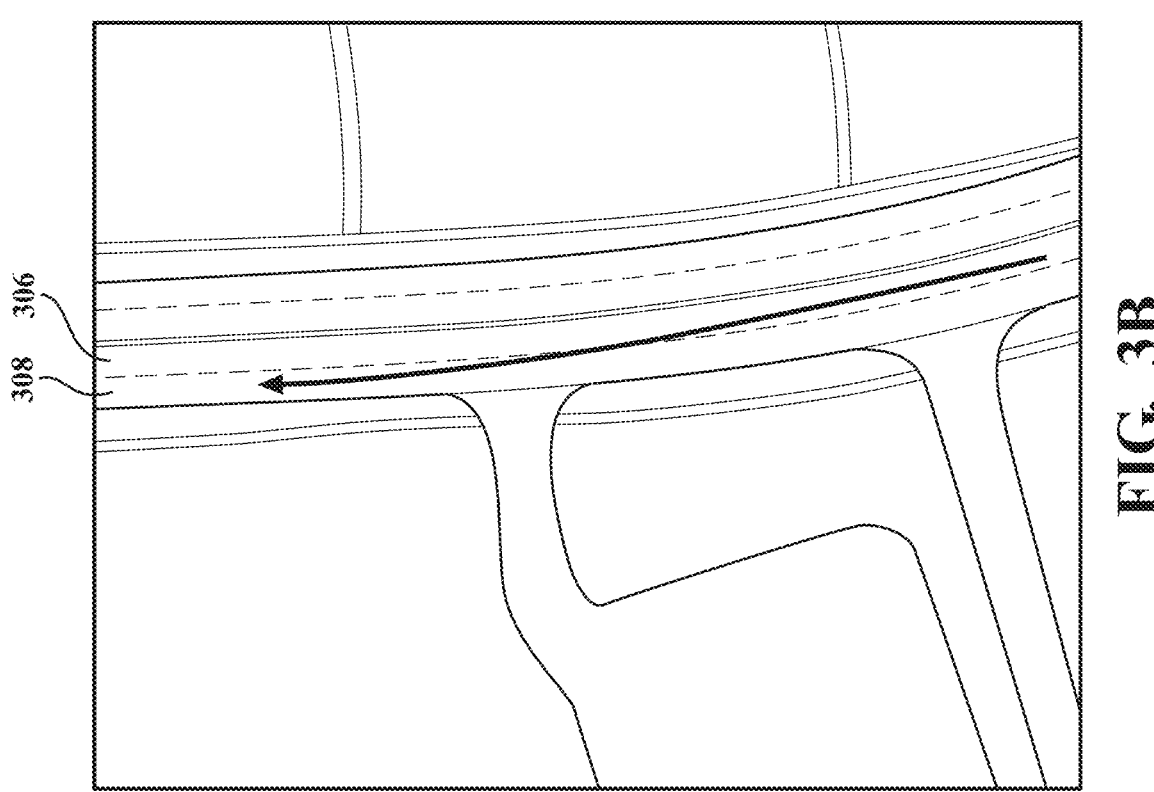

FIGS. 3A-3C illustrate example driving maneuvers. In the illustrated example of FIG. 3A, an operator of a vehicle 10 performs a turn signal tap as they are approaching an off ramp 302. Here, however, the operator delays changing lanes to take the off ramp 302 such that a turn indication score S remains high (e.g., satisfies a criterion) until the vehicle 10 settles into the lane 304 of the off ramp 302. In the illustrated example of FIG. 3B, the operator is performing a lane change from a middle lane 306 to a left lane 308, and a turn indication score S remains high (e.g., satisfies a criterion) until the vehicle 10 settles into the left lane 308. In the illustrated example of FIG. 3C, the operator is performing a U-turn between lanes 310 and 312 in a parking lot, and a turn indication score S remains high (e.g., satisfies a criterion) until the vehicle 10 settles into the next parking lot lane 312.

Returning to FIGS. 1 and 2, the intelligent turn indication score module 50 also includes an intelligent turn score determination module 53 for determining an intelligent turn score S based on the extended vehicle profile and the relative position or location of the vehicle 10 relative to an intended driving maneuver. In some examples, the intelligent turn score S may also be based on one or more parameters representing characteristics of a trailer towed by the vehicle 10 or cargo carried by the vehicle 10. In some implementations, the intelligent turn score S includes a weighted sum of some or all of a navigation route, a location of the vehicle, a location of a trailer towed by the vehicle, a location of an object transported by the vehicle, a vehicle kinematic, a trailer kinematic, an operator input to execute the intended driving maneuver, a topology, and trailer information. An example weighted sum S can be expressed as:

$$S = \sum_{k=T}^{k=T+N} \left( M_V^T R_V M_V + M_R^T R_R M_R + M_T^T R_T M_T + M_P^T R_P M_P \right) \qquad \text{EQN (1)}$$

where T is the starting sample index when the turn signal lever 13 is tapped, and T+N represents a moving or sliding window of inputs. Accordingly, the intelligent turn score S may be determined repeatedly over time as the operator operates the vehicle 10 to perform the intended driving maneuver to determine when to deactivate the external turn signal 14. Here, the vectors $M_V$, $M_R$, $M_T$, and $M_P$ represent a location of the vehicle 10 relative to an intended driving maneuver.

| Vehicle Dynamics Metrics | Road Topology Metrics |
|---|---|
| Steering angle ($\delta$) | Localization to must-turn lane ($t_l$) |
| Steering angle rate ($\dot{\delta}$) | Proximity to lane split ($d_s$) |
| Yaw rate ($\dot{\psi}$) | Proximity to lane merge ($d_m$) |
| Lateral acceleration ($a_y$) | Lane detection confidence ($c_l$) |
| Lateral velocity ($v_y$) | Proximity to must-turn point ($d_t$) |
| Driver applied torque ($\tau_d$) | Proximity to lane ending ($d_e$) |
| $M_V = [\delta \; \dot{\delta} \; \dot{\psi} \; a_y \; v_y \; \tau_d]$ | Lane marker type ($l_c$) |
| | Proximity to adjacent free space ($d_f$) |
| | $M_R = [t_l \; d_s \; d_m \; c_l \; d_t \; d_e \; l_c \; d_f]$ | and

| Traffic sign/object metrics | Planned/Behavioral metrics |
|---|---|
| Localization to turn sign ($s_t$) | Proximity to navigation route |
| Localization to traffic lights ($s_l$) | turn ($d_n$) |
| Localization to stop sign ($s_s$) | Left/right turn detected ($t_d$) |
| Proximity to emergency vehicles ($d_e$) | Lane change detected ($l_c$) |
| Proximity to traffic cones ($d_c$) | Data-driven turn prediction ($t_p$) |
| Proximity to temporary traffic signs ($d_s$) | Surround object turn detected ($t_s$) |
| $M_T = [s_t \; s_l \; s_s \; d_e \; d_c \; d_s]$ | $M_P = [d_n \; t_d \; l_c \; t_p \; t_s]$ |

The matrices $R_V$, $R_R$, $R_T$, and $R_P$ are diagonal weighting matrices, where the diagonal of each weighting matrix includes a relative weight for each component of the corresponding vector $M_V$, $M_R$, $M_T$, and $M_P$. For example, $$R_V = \begin{bmatrix} r_\delta & 0 & 0 & 0 & 0 & 0 \\ 0 & r_{\dot{\delta}} & 0 & 0 & 0 & 0 \\ 0 & 0 & r_{\dot{\psi}} & 0 & 0 & 0 \\ 0 & 0 & 0 & r_{a_y} & 0 & 0 \\ 0 & 0 & 0 & 0 & r_{v_y} & 0 \\ 0 & 0 & 0 & 0 & 0 & r_{\tau_d} \end{bmatrix}$$

Figure 3D:
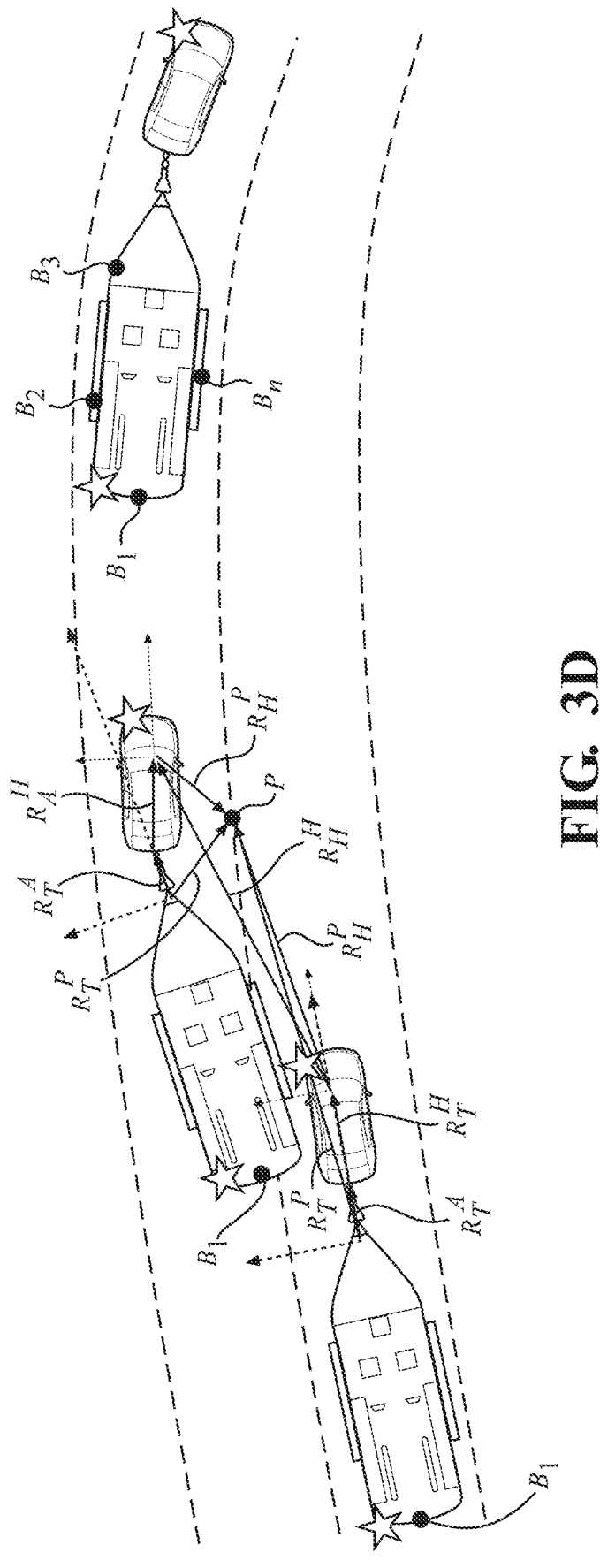

When available, trailer information 46a may be used when computing the turn indication score S. In some examples, the trailer information 46a is obtained via a trailer configuration HMI present on a display of the vehicle 10. For example, an operator can specify a length of a trailer. Additionally, or alternatively, the camera(s) 45 may be used to identify the length and relative position of a trailer or an object being transported by the vehicle 10 by, for example, detecting caution flags on the object in images captured by the camera(s) 45. As shown in the illustrated example of FIG. 3D, the lane from a trailer's perspective can be expressed as $$\overrightarrow{R_T^P}|_k = \overrightarrow{R_T^A}|_k + \overrightarrow{R_A^H}|_k + \overrightarrow{R_H^P}|_k \qquad \text{EQN (2)}$$

where $$\overrightarrow{R_T^A}|_k$$

is the location of an articulation point of the trailer, $$\overrightarrow{R_A^H}|_k$$

is the orientation of the where vehicle 10 relative to the articulation point, and $$\overrightarrow{R_H^P}|_k$$

is the lane from the vehicle's perspective. The lane from the trailer's perspective can then be used to determine the locations of boundary points $B_n$ of the trailer. The controller 20 can then, if the turn indication score S of the vehicle 10 is high (i.e., satisfies a criterion), maintain the turn signal 14 until the turn indication score S is not high (i.e., does not satisfy the criterion) and all boundary points $B_n$ of the trailer are in the destination lane.

The system 12 also includes another controller 60. The controller 60 may be, for example, a digital cockpit controller or any other controller of the vehicle 10. Specifically, the controller 60 stores machine-readable instructions for executing the operations shown in any of FIGS. 4 and 5 or described elsewhere in the present disclosure, for example, on memory hardware. The instructions may be executed by data processing hardware (e.g., a processor) of the controller 60 to perform the operations. The controller 60 includes a module 61 for processing driver customizations, such as enabling or disabling the intelligent turn signal system 12. The controller 60 also includes a module 62 for displaying turn signal information on an HMI 48 of the vehicle 10.

The system 12 also includes another controller 70. The controller 70 may be, for example, a body controller or any other controller of the vehicle 10. Specifically, the controller 70 stores machine-readable instructions for executing the operations shown in any of FIGS. 4 and 5 or described elsewhere in the present disclosure, for example, on memory hardware. The instructions may be executed by data processing hardware (e.g., a processor) of the controller 70 to perform the operations. The controller 70 includes a module 71 for processing driver turn signal commands, such as detecting activation of the turn signal lever 13, and providing turn signal status information to the controller 20. The controller 70 also includes a module 72 for controlling the external turn signal indicators 15 based on turn indication scores S determined by the controller 20, and a module 73 for executing turn signal commands.

Figure 4:
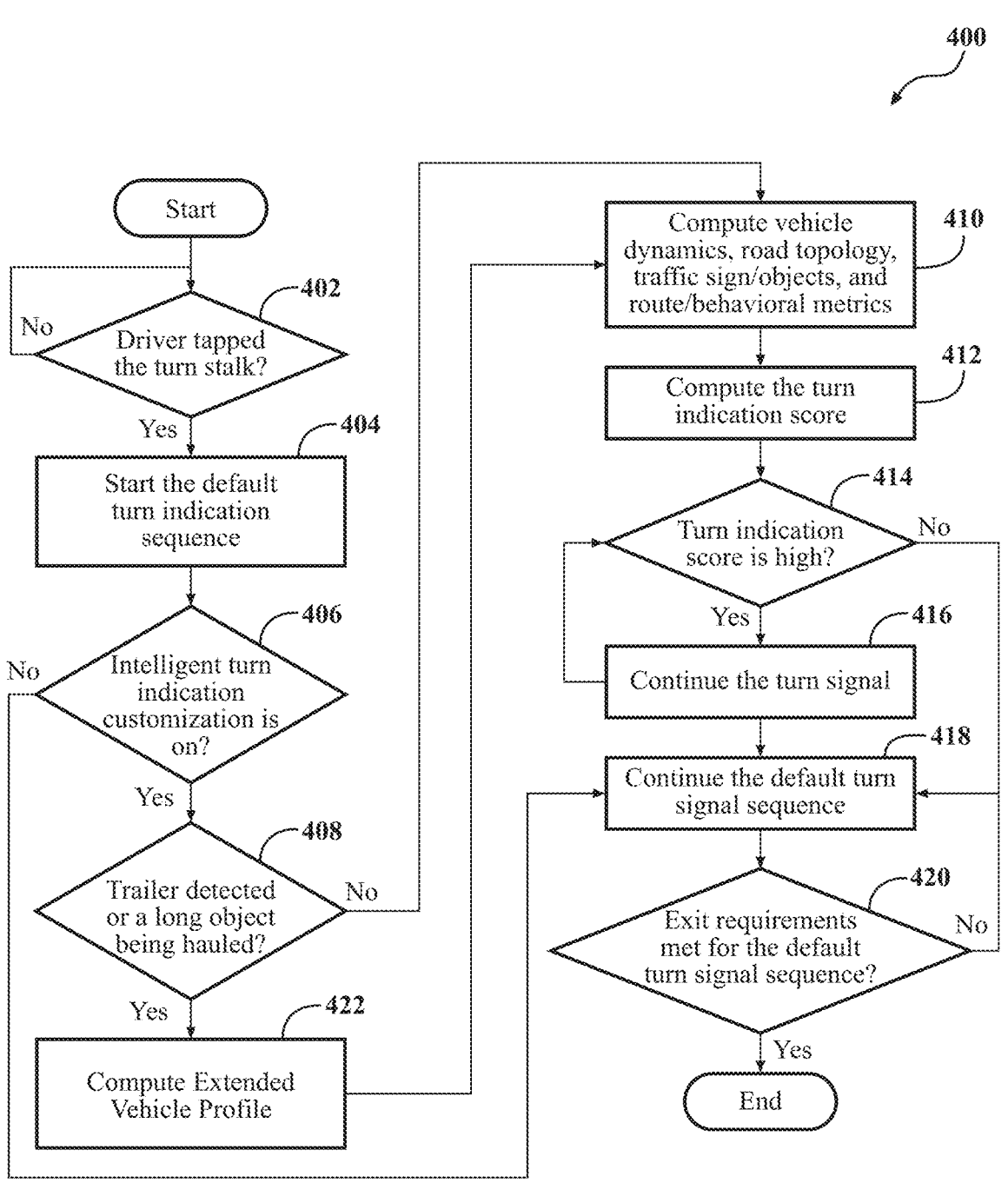
FIG. 4 is a flowchart of an example arrangement of operations for a method of automatically determining, responsive to a turn signal tap, a duration of a momentary turn signal.

FIG. 4 is a flowchart of an exemplary arrangement of operations for a computer-implemented method 400 of automatically determining, responsive to a turn signal tap of the turn signal lever 13 by an operator of the vehicle 10, a duration of a momentary turn signal 14 that is displayed on one or more external turn signal indicators 15, 15*a-n* of the vehicle 10. The operations may be performed by data processing hardware (e.g., the data processing hardware 24 of FIG. 1) based on executing instructions stored on memory hardware (e.g., the memory hardware 22 of FIG. 1). Many other ways of implementing the method 400 may be employed. For example, the order of execution of the operations may be changed, and/or one or more of the operations and/or interactions may be changed, eliminated, sub-divided, or combined. Additionally, the operations of FIG. 4 may be carried out sequentially and/or in parallel by, for example, separate processing threads, processors, devices, discrete logic, circuits, etc.

At operation 402, the method 400 includes detecting whether an operator of the vehicle 10 has tapped the turn signal lever 13. If the operator has tapped the turn signal lever 13, at operation 404, the method 400 includes starting a standard turn indication sequence. For example, activating a turn signal 14 for a pre-determined duration. At operation 406, the method 400 includes determining whether intelligent turn signals are enabled. If intelligent turn signals are enabled, at operation 408, the method 400 includes determining whether the vehicle 10 is towing a trailer or transporting a large object.

If the vehicle 10 is not towing a trailer or transporting a large object, at operation 410, the method 400 includes determining vehicle dynamics, road topology, traffic signs/objects, and route/behavioral metrics. At operation 412, the method 400 includes computing a turn indication score S. At operation 414, the method 400 includes determining whether the turn indication score S is high (i.e., satisfies a criterion). At operation 416, the method 400 includes, while the turn indication score S is high, continuing the turn signal 14. At operation 418, the method 400 includes, when the turn indication score S is not high (i.e., does not satisfy the criterion), resuming the default turn signal sequence. At operation 420, the method 400 includes determining whether exit requirements for the default turn signal sequence are satisfied. That is, whether the pre-determined duration has expired.

Returning to operation 408, if the vehicle 10 is towing a trailer or transporting a large object, at operation 422, the method 400 includes determining an extended vehicle profile that incorporates the trailer or object, and the control proceeds to operation 410.

FIG. 5 is a flowchart of an exemplary arrangement of operations for a computer-implemented method 500 of automatically determining, responsive to a turn signal tap of the turn signal lever 13 by an operator of the vehicle 10, a duration of a momentary turn signal 14 that is displayed on one or more external turn signal indicators 15, 15*a-n* of the vehicle 10. The operations may be performed by data processing hardware (e.g., the data processing hardware 24 of FIG. 1) based on executing instructions stored on memory hardware (e.g., the memory hardware 22 of FIG. 1). Many other ways of implementing the method 500 may be employed. For example, the order of execution of the operations may be changed, and/or one or more of the operations and/or interactions may be changed, eliminated, sub-divided, or combined. Additionally, the operations of FIG. 5 may be carried out sequentially and/or in parallel by, for example, separate processing threads, processors, devices, discrete logic, circuits, etc.

At operation 502, the method 500 includes, based on the turn signal tap, controlling an external turn signal indicator 15 to provide a turn signal 14 for a pre-determined duration, the turn signal visible to operators of other vehicles. At operation 504, the method 500 includes determining an intended driving maneuver of the vehicle 10 by the operator. At operation 506, the method 500 includes determining a location of the vehicle 10 relative to the intended driving maneuver.

At operation 508, the method 500 includes determining, based on the intended driving maneuver and the location, a turn indication score S representing whether the intended driving maneuver is complete. At operation 510, the method 500 includes, based on the turn indication score S satisfying a criterion, controlling the external turn signal indicator 15 to continue the turn signal 14 past a pre-determined duration. At operation 512, the method 500 includes, based on the turn indication score S not satisfying the criterion, controlling the external turn signal indicator 15 to de-activate the turn signal 14.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A vehicle comprising:

a turn signal lever configured to detect a turn signal tap by an operator of the vehicle, the turn signal tap activating a turn signal having a pre-determined duration;

an external turn signal indicator configured to, responsive to detection of the turn signal tap, provide the turn signal, the turn signal visible to operators of other vehicles;

data processing hardware; and memory hardware in communication with the data processing hardware and storing instructions that, when executed by the data processing hardware, cause the data processing hardware to perform operations responsive to the turn signal tap, the operations comprising:

determining an intended driving maneuver of the vehicle by the operator;

determining a location of the vehicle relative to the intended driving maneuver;

determining, based on the intended driving maneuver and the location, a turn indication score representing whether the intended driving maneuver is complete;

based on the turn indication score satisfying a criterion, controlling the external turn signal indicator to continue the turn signal past the pre-determined duration; and based on the turn indication score not satisfying the criterion, controlling the external turn signal indicator to de-activate the turn signal.

2. The vehicle of claim 1, wherein determining the intended driving maneuver is based on at least one of:

a predicted driver intent;

a measured vehicle dynamic;

a predicted vehicle dynamic;

an object detection;

a lane detection;

a navigation route;

the location of the vehicle;

a traffic control input;

a map;

a traffic sign;

a road marking;

a traffic light;

a lane merging;

a lane split; or an ending lane.

3. The vehicle of claim 1, wherein determining the location of the vehicle relative to the intended driving maneuver comprises at least one of:

determining a location of a trailer towed by the vehicle relative to the intended driving maneuver; or determining a location of an object transported by the vehicle relative to the intended driving maneuver.

4. The vehicle of claim 3, wherein controlling the external turn signal indicator to continue the turn signal past the pre-determined duration comprises continuing the external turn signal indicator until the turn indication score does not satisfy the criterion and all boundary points of the trailer are in a destination lane.

5. The vehicle of claim 1, wherein the turn indication score comprises a weighted sum of at least two of:

a navigation route;

a location of the vehicle;

a location of a trailer towed by the vehicle;

a location of an object transported by the vehicle;

a vehicle kinematic;

a trailer kinematic;

an operator input to execute the intended driving maneuver;

a topology; or trailer information.

6. The vehicle of claim 1, wherein the turn indication score is determined repeatedly over time as the operator operates the vehicle to perform the intended driving maneuver to determine when to deactivate the turn signal.

7. The vehicle of claim 1, further comprising:

an advanced driver-assistance system (ADAS) controller comprising the data processing hardware and the memory hardware; and a body controller configured to:

detect the turn signal tap;

provide an indication of the turn signal tap to the ADAS controller; and control activation and de-activation of the turn signal responsive to inputs from the ADAS controller.

8. A computer-implemented method executed by data processing hardware that causes the data processing hardware to perform operations responsive to a turn signal tap by an operator of a vehicle, the operations comprising:

controlling an external turn signal indicator to provide a turn signal for a pre-determined duration, the turn signal visible to operators of other vehicles;

determining an intended driving maneuver of the vehicle by the operator;

determining a location of the vehicle relative to the intended driving maneuver;

determining, based on the intended driving maneuver and the location, a turn indication score representing whether the intended driving maneuver is complete;

based on the turn indication score satisfying a criterion, controlling the external turn signal indicator to continue the turn signal past the pre-determined duration; and based on the turn indication score not satisfying the criterion, controlling the external turn signal indicator to de-activate the turn signal.

9. The computer-implemented method of claim 8, wherein determining the intended driving maneuver is based on at least one of:

a predicted driver intent;
a measured vehicle dynamic;
a predicted vehicle dynamic;
an object detection;
a lane detection;
a navigation route;
the location of the vehicle;
a traffic control input;
a map;
a traffic sign;
a road marking;
a traffic light;
a lane merging;
a lane split; or
an ending lane.

10. The computer-implemented method of claim 8, wherein determining the location of the vehicle relative to the intended driving maneuver comprises at least one of:
   determining a location of a trailer towed by the vehicle relative to the intended driving maneuver; or
   determining a location of an object transported by the vehicle relative to the intended driving maneuver.

11. The computer-implemented method of claim 10, wherein controlling the external turn signal indicator to continue the turn signal past the pre-determined duration comprises continuing the external turn signal indicator until the turn indication score does not satisfy the criterion and all boundary points of the trailer are in a destination lane.

12. The computer-implemented method of claim 11, wherein the turn indication score comprises a weighted sum of at least two of:
   a navigation route;
   a location of the vehicle;
   a location of a trailer towed by the vehicle;
   a location of an object transported by the vehicle;
   a vehicle kinematic;
   a trailer kinematic;
   an operator input to execute the intended driving maneuver;
   a topology; or
   trailer information.

13. The computer-implemented method of claim 11, wherein the turn indication score is determined repeatedly over time as the operator operates the vehicle to perform the intended driving maneuver to determine when to deactivate the turn signal.

14. A system comprising:
data processing hardware; and
memory hardware in communication with the data processing hardware and storing instructions that, when executed by the data processing hardware, cause the data processing hardware to perform operations responsive to a turn signal tap by an operator of a vehicle, the operations comprising:
   controlling an external turn signal indicator to provide a turn signal for a pre-determined duration, the turn signal visible to operators of other vehicles;
   determining an intended driving maneuver of the vehicle by the operator;

determining a location of the vehicle relative to the intended driving maneuver;
   determining, based on the intended driving maneuver and the location, a turn indication score representing whether the intended driving maneuver is complete;
   based on the turn indication score satisfying a criterion, controlling the external turn signal indicator to continue the turn signal past the pre-determined duration; and
   based on the turn indication score not satisfying the criterion, controlling the external turn signal indicator to de-activate the turn signal.

15. The system of claim 14, wherein determining the intended driving maneuver is based on at least one of:
   a predicted driver intent;
   a measured vehicle dynamic;
   a predicted vehicle dynamic;
   an object detection;
   a lane detection;
   a navigation route;
   the location of the vehicle;
   a traffic control input;
   a map;
   a traffic sign;
   a road marking;
   a traffic light;
   a lane merging;
   a lane split; or
   an ending lane.

16. The system of claim 15, wherein determining the location of the vehicle relative to the intended driving maneuver comprises at least one of:
   determining a location of a trailer towed by the vehicle relative to the intended driving maneuver; or
   determining a location of an object transported by the vehicle relative to the intended driving maneuver.

17. The system of claim 16, wherein controlling the external turn signal indicator to continue the turn signal past the pre-determined duration comprises continuing the external turn signal indicator until the turn indication score does not satisfy the criterion and all boundary points of the trailer are in a destination lane.

18. The system of claim 17, wherein the turn indication score comprises a weighted sum of at least two of:
   a navigation route;
   a location of the vehicle;
   a location of a trailer towed by the vehicle;
   a location of an object transported by the vehicle;
   a vehicle kinematic;
   a trailer kinematic;
   an operator input to execute the intended driving maneuver;
   a topology; or
   trailer information.

19. The system of claim 15, wherein the turn indication score is determined repeatedly over time as the operator operates the vehicle to perform the intended driving maneuver to determine when to deactivate the turn signal.

* * * * *